United States Patent [19]
Sidman et al.

[11] Patent Number: 5,155,422
[45] Date of Patent: Oct. 13, 1992

[54] SELF-TUNING ADAPTIVE BANDWIDTH REGULATOR

[75] Inventors: Michael D. Sidman; Dwight R. Kinney, both of Colorado Springs, Colo.

[73] Assignee: Digital Equipment Corporation, Maynard, Mass.

[21] Appl. No.: 676,960

[22] Filed: Mar. 28, 1991

[51] Int. Cl.$^5$ ............................................... G11B 33/00
[52] U.S. Cl. ..................................... 318/560; 318/561; 318/611; 318/615; 360/77.04; 360/69
[58] Field of Search ................ 318/560-630; 360/77.02, 77.03, 77.04, 77.06, 77.08, 78.02, 78.04, 78.06, 78.08, 69, 75

[56] References Cited
U.S. PATENT DOCUMENTS 4,533,991  8/1985  Georgis .......................... 318/561 X
4,839,573  6/1989  Wise ................................. 318/615
4,890,172  12/1989  Watt et al. ....................... 360/77.04

OTHER PUBLICATIONS

Sidman, "Adaptive Control of a Flexible Structure", A Dissertation Submitted to the Department of Electrical Engineering and the Committe on Graduate Studies of Stanford University, Jun. 1986.

Primary Examiner—Paul Ip
Attorney, Agent, or Firm—Arnold, White & Durkee

[57] ABSTRACT

Methods and apparatus for automatically identifying and adapting to changes in the overall gain of the mechanical plant in a digital servo control system to maintain a constant bandwidth.

10 Claims, 10 Drawing Sheets

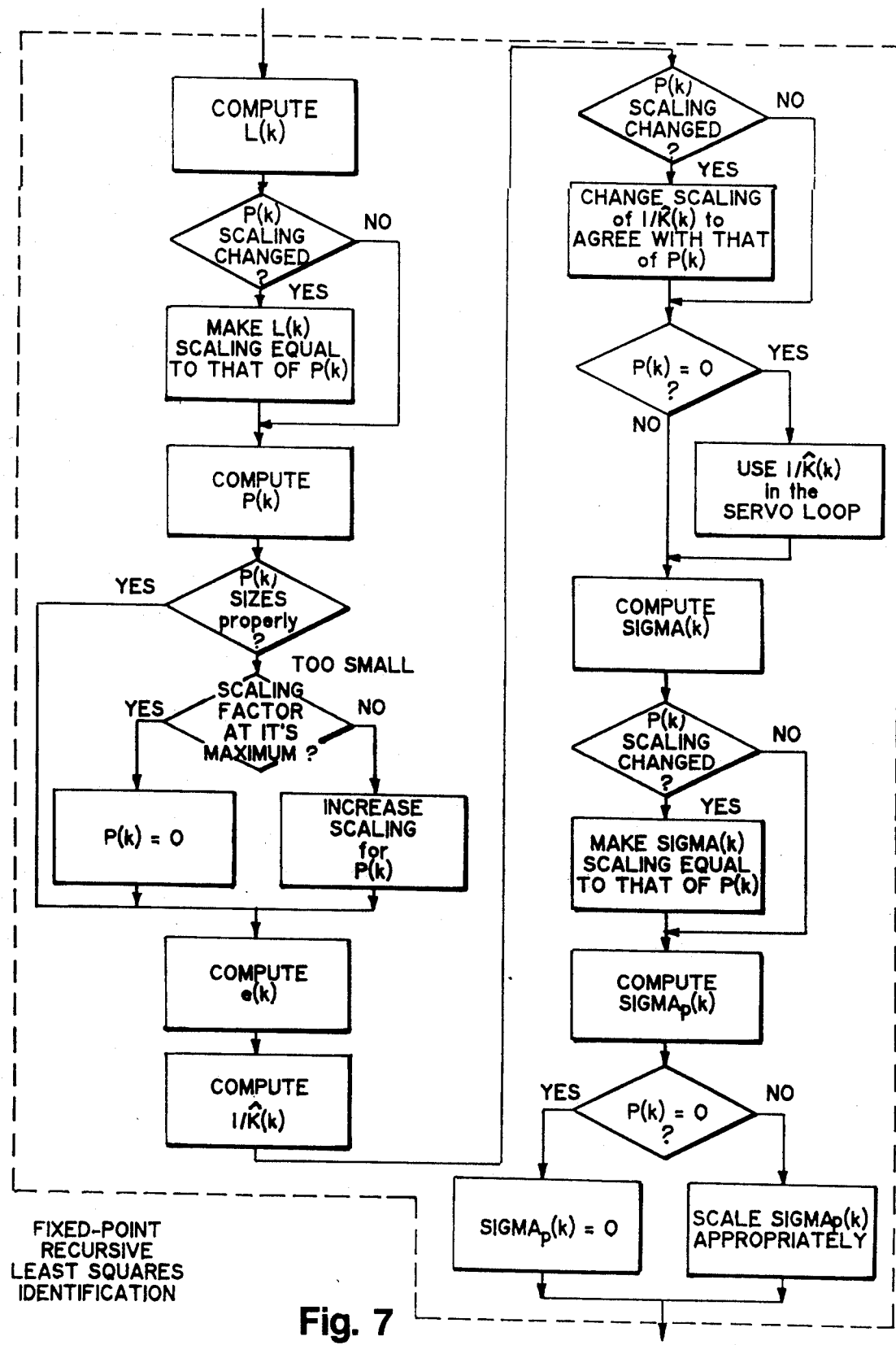
Fig. 7 — FIXED-POINT RECURSIVE LEAST SQUARES IDENTIFICATION

SELF-TUNING ADAPTIVE BANDWIDTH REGULATOR

FIELD OF THE INVENTION

The present invention relates to the adaptive correction of overall feedback loop gain to maintain the bandwidth of digital position control systems, and more particularly to methods and apparatus for automatically identifying changes in overall gain of a mechanical plant and adjusting servo loop gain accordingly.

BACKGROUND OF THE INVENTION

Digital position control systems comprise a digital compensator that regulates position of a mechanical plant or actuator. The compensator responds to periodically sampled position data from a transducer and data converter that respectively measures and discretizes plant position or relative position. The compensator provides a sequence of control values that, when converted and amplified, constitute a control signal such as a motor current command signal which is provided to the actuator. The control signal attempts to correct the position of the actuator to that commanded and to decrease position error caused by disturbances in the system.

Fixed servo control compensators are optimized for a particular plant condition to achieve a specified loop gain and bandwidth. In practical servo position control systems, plant gain may vary substantially due to changes in motor torque constant in plants that use rotary actuators, or motor force constant in plants that use voice coil-type actuators, power amplifier gain, payload inertia, position sensor sensitivity, or other gain variations in the control electronics. In servo systems for head positioning in disc and tape drives used for information storage and the like, variations in overall plant gain are also often due to variations in track position detector gain, data head gap width and tolerances in the controller electronics.

Such overall plant gain variation directly affects the overall gain of the servo loop and, in so doing, affects servo bandwidth. The servo compensator, which is designed and optimized for a particular servo loop bandwidth, operates the servo loop suboptimally when bandwidth variations occur. Changes in loop gain may reduce the disturbance rejection properties of the closed loop control system, may act to make the system sluggish or, conversely, to destabilize the control system, especially when mechanical resonances are present. If high levels of performance are demanded of the compensator design, the compensator may stabilize the control loop only over a narrow range of loop gain and bandwidth, and system performance usually degrades rapidly when minor deviations in loop gain from the nominal are present.

As part of the design process itself, designers have used frequency response measurement equipment to identify the response of an open loop servo system and to manually adjust the gain and dynamics of the compensator to achieve a target bandwidth. This requires the injection of signals (typically sinusoidal or random noise) into the servo loop.

Measurement instruments typically use synchronous demodulation or Fourier transform (FFT) techniques to determine the gain at the frequency of the desired bandwidth. These, however, are manual, non-adaptive techniques that result in a one-time gain adjustment to the servo loop. Using this measured data, a fixed compensator can then be determined which will perform optimally, but only under the plant condition from which the data was obtained. If this condition changes either over time or from one system to another (in the case where the same compensator design is used for different mechanical plants) the fixed compensator is incapable of adapting and suboptimal performance results.

Therefore, it is desirable to quickly and accurately determine the overall plant gain in real time and adjust the open loop gain so that the total open loop unity gain bandwidth remains constant. Adaptive control is desirable to account for overall plant gain variation including that caused by actuator motor torque constant, payload inertia and sensor gain, whose combined variations may otherwise result in unacceptably large changes in overall plant gain. This gain variation may act to destabilize the servo system or reduce its performance.

Adaptive techniques disclosed in the prior art generally require the acquisition and analysis of a relatively very large set of data samples and consequently a lengthy batch computation time. Accordingly, such methods are unable to quickly and accurately estimate the plant gain and provide proper loop gain compensation. These methods are also sensitive to broadband noise contributed by data converter quantization, high frequency resonance activity in the mechanical plant, low frequency disturbances such as track runout and bias forces and other DC disturbances known to disturb the servo loop in disc drive systems.

SUMMARY OF THE INVENTION

The present invention overcomes the problems in the prior art with an adaptive digital servo control system that maintains constant loop or bandwidth in a servo loop despite changes in the overall gain of the controlled mechanical plant or actuator. A method according to the present invention makes use of limited a priori knowledge of the plant dynamics to simplify the calculations that estimate overall plant gain. Furthermore, the computational simplicity of a self-tuning Adaptive Bandwidth Regulator renders it suitable for use in real-time product applications that utilize a microprocessor or digital signal processor for digital control. The method uses both a streamlined parametric identification method and an automatic self-excitation feature that ensures rapid, accurate identification without causing large excursions of the plant.

In practical systems such as disk drive servo systems, a servo compensator regulates the position of the mechanical plant. Plant gain is varied substantially by changes in motor force or torque constant, power amplifier gain or position sensor gain. Such overall gain variation in the plant directly affects the overall gain of the servo loop and, in so doing, affects servo bandwidth. The servo compensator, which is designed and optimized for a particular servo loop bandwidth, operates the servo loop suboptimally when bandwidth variations occur. Changes in loop gain may reduce the disturbance rejection properties of the closed loop control system, may act to make the system sluggish or conversely, may act to destabilize the control system, especially when mechanical resonances are present. The adaptive control system of the present invention estimates the overall plant gain through parametric identification and uses this estimate to restore proper servo bandwidth.

An identification process according to the invention estimates the overall gain of the plant in real time by comparing measured plant output with the output of a concurrently running digital plant model that receives the same control signal as the physical plant. These two discrete-time signals are each digitally filtered so as to pass information over the range of possible unity-gain crossover frequencies of the servo loop and also substantially reject noise and disturbances that affect the servo loop and also reject high-frequency, unmodeled plant dynamics. The filtered signals are then sent to a single-parameter Recursive Least Squares (RLS) identification algorithm that uses the limited a priori knowledge of the plant incorporated in the reduced-order plant model. The single parameter recursive identification requires only modest computational power, making this system practical for real time applications.

This a prior knowledge includes the fact that the mechanical plant may have predictable dynamics in its transfer function arising from rigid body and other known plant dynamics and electronic filtering. At every time step after the identification algorithm is reset, it improves its estimate of the overall plant gain based on the information it has accumulated. When the estimate has essentially reached a steady state value, it can be used to correct the servo loop for overall plant gain variation. In this way, the overall gain of the servo compensator is adjusted based on the estimate of overall plant gain to restore the servo loop bandwidth back to the nominal value for which the existing fixed compensator was optimized.

The speed of convergence and accuracy of the estimate of overall plant gain produced by the identification depends in part on how closely the shape of the frequency response of the plant model corresponds to that of the physical mechanical plant. The plant model is designed to incorporate the dynamics that dominate at least the low to medium frequency behavior of the plant. For a position control system such as found in disk drive head positioning servo systems, in which control force or torque is applied to the postioner by a voice-coil motor or torque motor respectively, the plant model may be comprised simply of the zero-order-hold equivalent of a double integrator. Other dynamics that are known to exist in the controlled plant, including substantially invariant resonances, anti-aliasing filters and other filters also may be incorporated into the plant model to improve the estimation of overall plant gain.

The measured plant output signal and the signal produced by the plant model are both identically bandpass filtered to restrict the frequency content of the information into the identification routine to that range of frequencies in which the unity-gain crossover point might occur over the range of plant gain variation. Band-limiting input data in this manner renders the identification substantially insensitive to disturbances outside the frequency range of interest and results in superior gain estimation accuracy and rapid covergence. Each such bandpass filter is preferably comprised of a digital Butterworth high-pass filter whose cutoff frequency is at or below the minimum unity-gain crossover frequency of the servo loop in cascade combination with a digital low-pass filter whose cutoff frequency is at or above the maximum unity-gain frequency of the servo loop.

The z-plane zeroes of the Butterworth high-pass filter coincide and may be used to cancel the conditionally-stable rigid body poles of the plant model, located at $z=1$. Pairs of Butterworth filter zeroes may also be relocated to achieve a sharp notch band-reject action that prevents repetitive or periodic signals and disturbances in the plant from degrading the identification process. In disk drive applications, this notch action substantially prevents identification errors from runout disturbances, which are harmonically related to disk rotation. For a disk drive position control system, a sixth or higher order Butterworth high-pass filter is preferred. When cascaded as a combined filter with the plant model, two of the Butterworth zeros at $z=1$ cancel the two unstable plant model poles yielding a composite stable system. Two additional zeroes are relocated in the z plane to notch fundamental frequency runout signal components. The two or more remaining zeroes are left at $z=1$ to provide necessary DC and low-frequency rejection which would otherwise bias the identification estimate.

The reliability, accuracy and rapid covergence of the identification process are also ensured by exciting the controlled plant with bandlimited perturbation modulated by a I resultant of the RLS identification process, called SIGMAP This method ensures the plant is adequately excited for the purpose of identification even during quiescent periods. This method also limits plant excitation to the frequency range where identification information is useful for estimating overall plant gain. Since the purpose of the identification process is to identify the plant gain only within the range of frequencies where the servo loop unity-gain crossing may occur, it is only necessary to perturb the system within this range. A bandlimited excitation signal prevents unnecessary excitation of unmodeled high frequency resonances in the plant. Excitation of these modes can degrade the identification. It also prevents low-frequency excitation, which may cause excessive excursions of the controlled plant.

The same band-pass filter characteristic used for processing the signals used by the identification may also be used for processing a random white noise sequence into a bandlimited excitation signal. This may be done either in real time or as an off-line task that generates a bandlimited excitation sequence stored in a look-up table. As the identification process progresses, the excitation signal is modulated by SIGMA or its peak detected version, SIGMAP, which decreases asymptotically as identification is achieved. This process ensures very rapid and accurate estimation of overall plant gain, even in the presence of other disturbances to the plant.

BRIEF DESCRIPTION OF THE DRAWING

FIG. 7 is a flow chart that represents the additional methodology according to the present invention to provide dynamic scaling for fixed-point digital processing.

DESCRIPTION OF THE INVENTION

Figure 1:
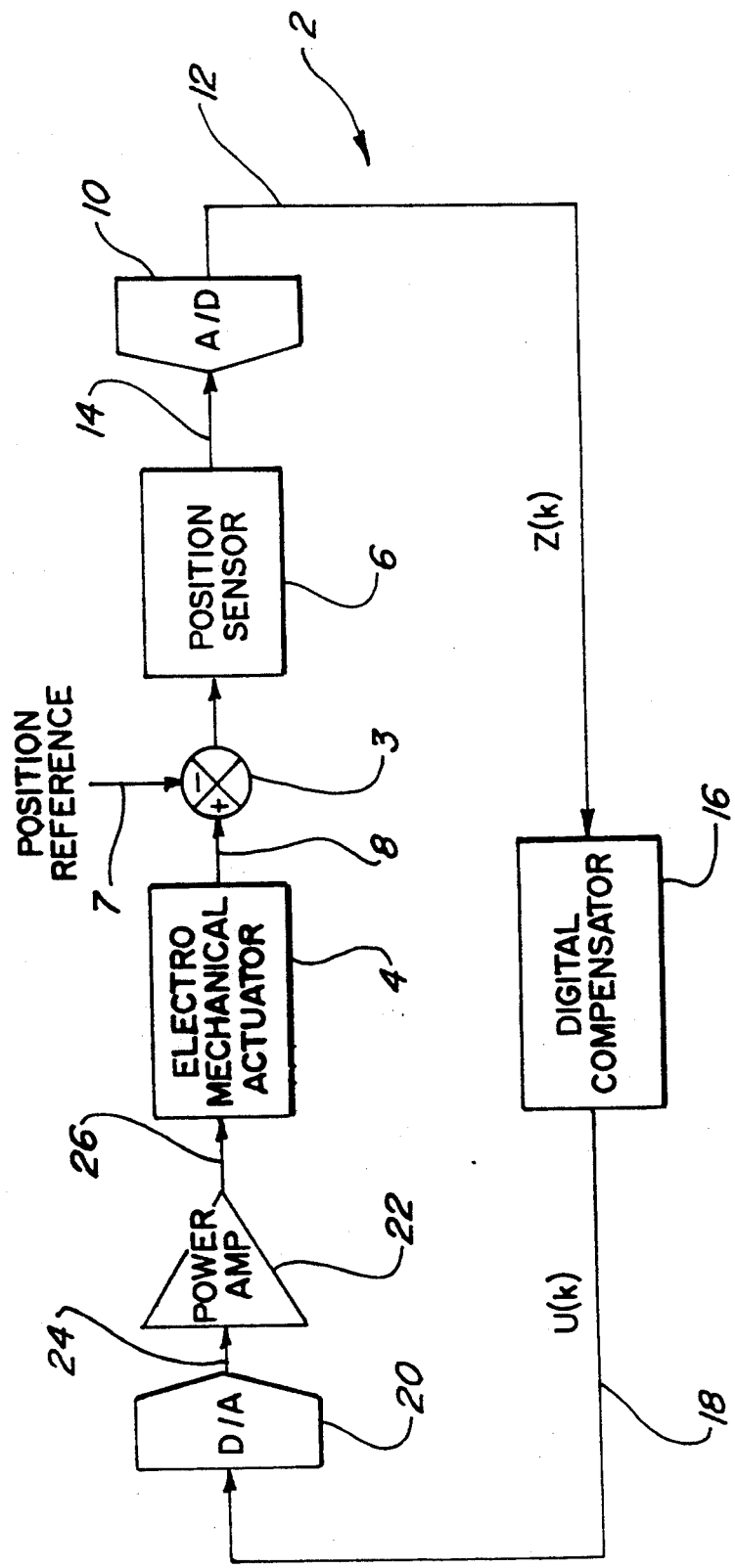
FIG. 1 is a block diagram of a typical digital servo control positioning system according to the prior art.

Referring to the drawings, wherein reference characters designate like or corresponding parts throughout the views, FIG. 1 is a typical servo control positioning system 2 according to the prior art. The prior art system 2 comprises an electro-mechanical actuator 4 for positioning a controlled element which is represented by a line 8, such as the actuator arm in a disc drive unit, and a position sensor 6 for sensing the position of the controlled element 8 that is positioned by the actuator 4.

The position sensor 6 typically produces a position error signal on a line 14 that is representative of the relative position of the controlled element 8 with respect to a reference position indicated by a line 7. The reference position represents the desired position of the controlled element. The representation of a comparator 3 determines the position error on a line 5 that is the difference between the position of the controlled element 8 and the position reference 7.

The position error signal 14 is discretized into a digital signal format by an analog-to-digital (A/D) converter 10. The A/D converter 10 produces a discretized digital format position error signal from its output on a line 12 that corresponds to the variable analog position error signal from the output of the comparator 3.

A digital compensator 16, described in more detail below, processes the discretized position error signal received on the line 12. The digital compensator 16 uses the position information in the discretized position error signal to compute a discretized command signal in digital format for dynamic position correction of the electro-mechanical actuator 4.

The discretized command signal, typically a current command signal generated by the digital compensator 16, is supplied on a line 18 to the input of a digital-to-analog (D/A) converter 20. The D/A converter 20 converts the discretized command signal to a corresponding analog command signal. The analog command signal is supplied from the output of the D/A converter 20 to the input of a power amplifier 22 via a line 24. Typically, the power amplifier 22 is a transconductance type that converts a voltage signal to a current signal. The correction signal from the output of the power amplifier 24 is supplied to the input of the electro-mechanical actuator 4 via a line 26 to drive the electro-mechanical actuator 4.

The electro-mechanical plant of the system 2 is taken to be that portion of the servo control system between the computed plant input and the measured plant output. In this case, the computed plant input is represented by the discretized current command signal on the line 18 and the measured plant output is represented by the discretized position error signal on the line 12. Typically, the electro-mechanical plant approximates a double integration of the calculated plant input on the line 18 to produce the measured plant output on the line 12. The plant may contain other dynamics such as mechanical resonances, anti-aliasing filter action, or other filters.

It is generally difficult to control a high performance servo system comprising an electro-mechanical plant that exhibits a large variation in gain. This is because the gain variation causes a corresponding shift in the unity-gain crossover frequency of the total open servo loop, i.e., the cascade combination of the mechanical plant and compensator. What is meant by the unity gain crossover frequency in this case is that frequency at which the open loop gain passes through unity.

In the preferred embodiment, the electro-mechanical plant of the servo system 2 converts the discretized command signal on the line 18 to the discretized position error signal on the line 12. The discretized command signal on the line 18 represents the control acceleration of the plant and the discretized position error signal represents the resultant position of the electro-mechanical plant. Thus, the electro-mechanical plant produces an output that approximates a double integration of its input.

Since the operation of the electro-mechanical plant approximates a double integration of the calculated plant input on the line 18, the frequency response magnitude of the electro-mechanical plant is generally in an inverse square proportion to frequency, or 12 db per octave. Of course, the plant need not be a pure double integrator, nor the power amplifier of the transconductance type.

Figure 2:
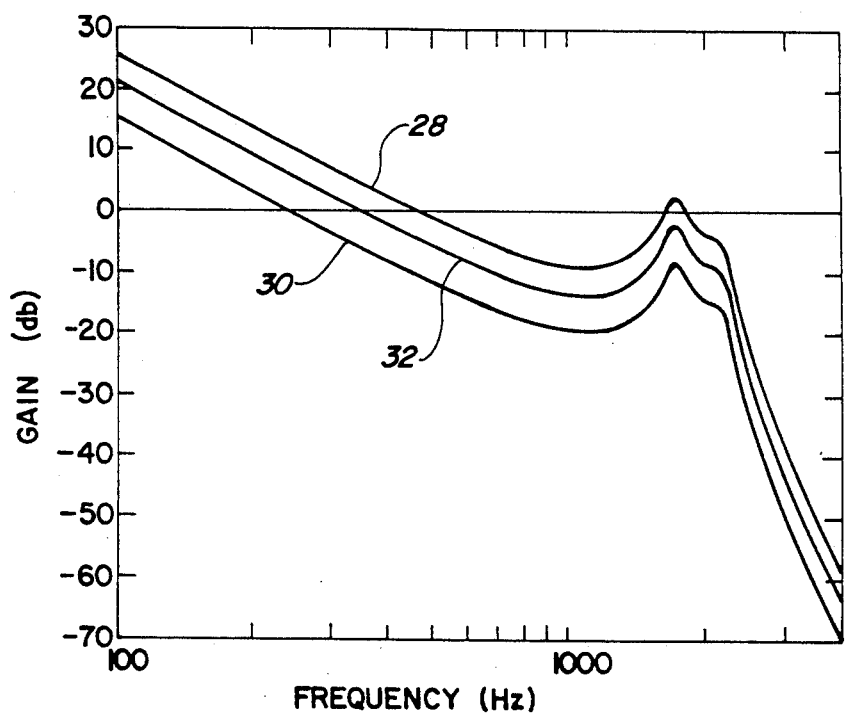
FIG. 2 is a graphical representation of a frequency response characteristic for a typical high order electromechanical actuator for three overall plant gain conditions.

The frequency response of a typical high order electro-mechanical plant used in connection with a servo controlled positioning system for disc drive applications is shown in FIG. 2. What is meant by a high order plant is that, in addition to the two low frequency (double integrator) rigid body poles, it has a number of poles that correspond to the resonances that in this example are evident in the one to three KHz range. The variation of gain in the electro-mechanical plant in turn causes a corresponding shift of the unity-gain crossover frequency in the overall servo system.

The maximum gain of the plant as a function of frequency is represented by a line 28. The minimum gain of the plant as a function of frequency is represented by a line 30. The nominal gain of the plant as a function of frequency is represented by a line 32.

It may be seen that the gain of the electro-mechanical plant (and therefore the total open loop gain) varies by as much as ten db, or a little more than three to one, for frequencies less than 1000 Hz in this case. A plurality of resonances may occur in the frequency range between approximately one and three KHz or above in disc drive systems.

The maximum, minimum and nominal gains of the electro-mechanical actuator 4 as a function of frequency represented by the lines 28, 30 and 32 respectively are all shown with respect to a zero db reference level that represents unity gain. The unity gain crossover frequency varies between approximately 450 Hz at maximum gain and 140 Hz at minimum gain, and it is approximately 340 Hz at nominal gain.

The maximum level of the resonances of the electro-mechanical plant range from approximately plus three db above the zero db reference level at maximum gain to minus eight db at minimum gain, with a maximum level of approximately minus three db at nominal gain. A servo control system can be unstable when the total open loop gain of the system exceeds unity and the total open loop phase exceeds −180 degrees.

The electro-mechanical plant of the servo system 2 is likely to cause such instability when its gain exceeds that of the nominal gain level because the level of its resonances in combination with the compensator action then approach or exceed the unity gain level. To prevent servo system instability, the frequency response of the feedback loop must be modified to compensate for these resonances at maximum gain conditions. Alternatively, the loop gain must be reduced to prevent the gain of the electro-mechanical plant from approaching unity in the frequency range of its resonances.

Typically, total open loop phase is maximum at the anticipated unity-gain frequency. Even if the plant was free of resonances, the phase margin of the system as measured at the first unity-gain crossover frequency is typically lower for a plant condition for which the compensator was not optimized. Lower phase margin means poorer step and settling response.

The open loop gain of the system at low-frequencies indicates how well the servo rejects low-frequency disturbances. Low unity gain crossover means lower servo bandwidth, which extends the response time of the servo, making it sluggish.

Figure 3:
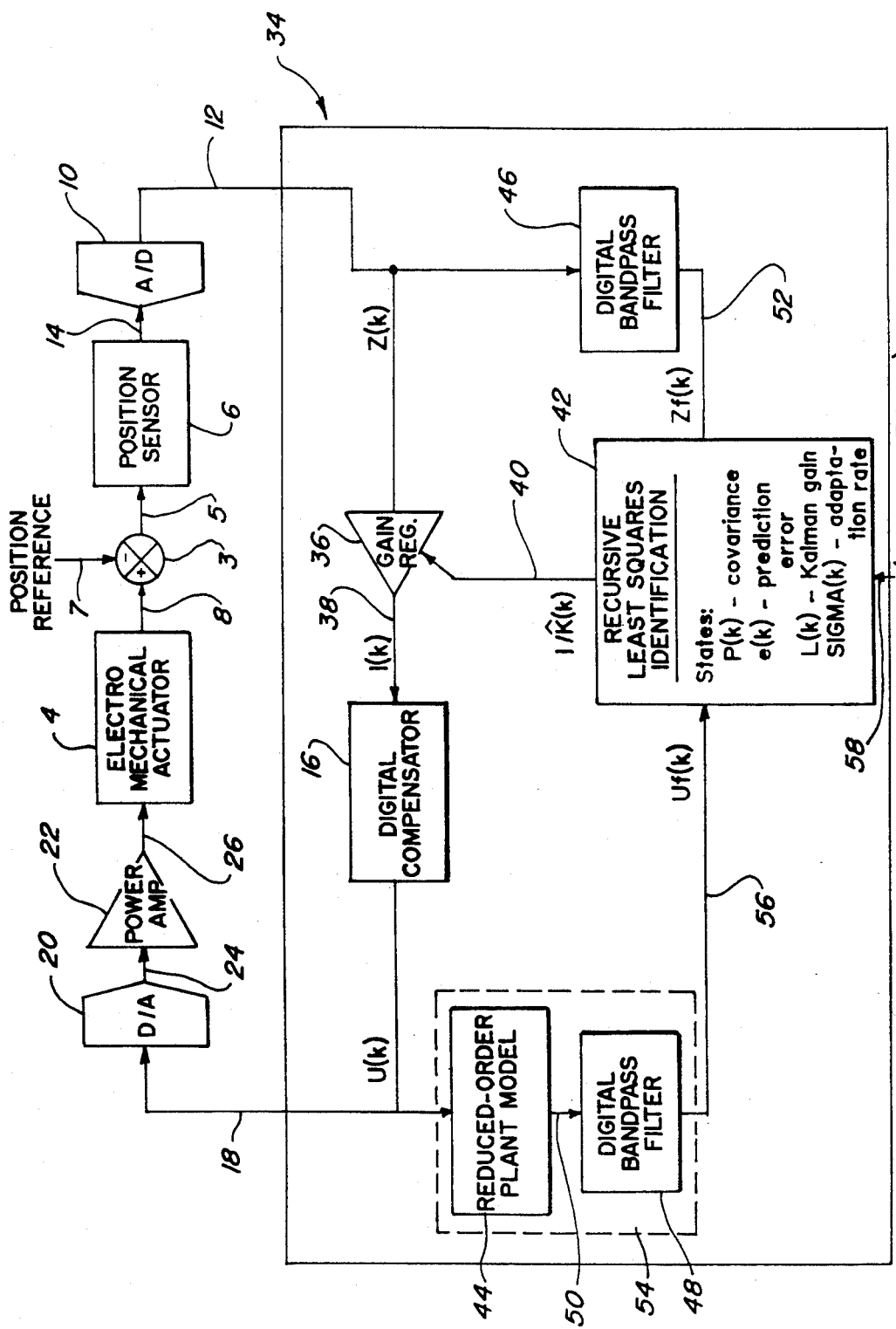
FIG. 3 is a simplified block diagram of a basic adaptive servo control positioning system according to the present invention.

The present invention overcomes these and other problems associated with overall gain variation attributable to the electro-mechanical plant as most clearly illustrated by the basic embodiment of the invention shown in FIG. 3. This embodiment comprises an adaptive servo control system 34. The adaptive servo control system 34 comprises the same basic elements as the prior art servo control system 2 described above in connection with FIG. 1, as well as additional elements that are unique to the present invention.

According to the present invention, the gain of the adaptive servo control system 34 is changed by a gain regulator 36 that changes its amplification, or attenuation, in response to an estimate of the gain of the electro-mechanical plant of the servo system 34. The discretized position error signal on the line 12 is supplied to the input of the gain regulator 36. The gain regulator 36 produces a gain controlled position error signal on a line 38. The gain controlled position error signal on the line 38 is fed to the input of the digital compensator 16.

The gain regulator 36 controls its gain or attenuation in response to a gain control signal fed to a gain control input of the gain regulator 36 on a line 40. In the preferred embodiment, the gain control signal on the line 40 corresponds to the most recent estimate of the reciprocal of the overall gain for the electro-mechanical plant, as described in detail below. It will be appreciated that the digital compensator 16 and the gain regulator 36 may be interchanged with appropriate modification.

Using the servo system 34 with an electro-mechanical plant having a frequency response as shown in FIG. 2, it is desirable that the digital compensator 16 extend the nominal total open loop unity gain bandwidth of the servo system 34 to approximately 400 Hz. Due to the gain variation of the electro-mechanical plant, this total open loop unity gain crossover frequency can then vary between approximately 290 and 510 Hz.

A single parameter Recursive Least Square (RLS) identification process 42 determines the gain control signal in response to its estimate of the reciprocal of the gain of the electro-mechanical plant. It bases this estimate on the measured plant output, as represented by the discretized position error signal on the line 12, and the calculated plant input or control, as represented by the discretized command signal on the line 18.

As described above, the operation of the electro-mechanical plant may approximate a double integration of the discretized command signal on the line 18. Identification of the reciprocal plant gain is accomplished by processing the discretized position error signal on the line 12 in combination with the discretized command signal on the line 18.

This is conveniently done with a reduced order model of the electro-mechanical plant 44 that accepts the discretized command signal on the line 18. It is reduced order in the sense that it does not have all of the dynamics of the electro-mechanical plant itself.

It is also desirable that the signals that are processed by the RLS identification algorithm 42 both contain spectral information limited to the approximate frequency range for which the gain estimate of the electro-mechanical plant is most important. This frequency range is that of the expected unity gain crossover frequency of the feedback loop including the digital compensator 16, between the minimum and the maximum gain levels of the electro-mechanical plant, between approximately 290 and 510 Hz.

A first digital bandpass filter 46 is used to filter the discretized position error signal on the line 12 that represents the measured electro-mechanical plant output. A second digital bandpass filter 48 is used to filter the discretized command signal from the plant model 44 on a line 50. The frequency responses of the filters 46 and 48 are identical and encompass the range of frequencies of the expected total open loop unity gain crossover point.

The frequency response of the digital bandpass filters 46 and 48 are of sufficiently high order for substantially passing only the desired band of frequencies that represent the frequency range through which the unity gain crossover of the total open loop varies. In addition, the frequency response of filters 46 and 48 sharply attenuate all frequencies above and below this frequency range to prevent disturbances from biasing the identification.

The higher frequency spectral information that must be attenuated is due to such disturbances as high frequency resonances and the analog-to-digital quantization noise in the electro-mechanical plant. The lower frequency spectral information that must be attenuated is due to such disturbances as mechanical vibration and runout, friction, air turbulence, and bias forces within the electro-mechanical plant. In addition to providing the desired attenuation outside of the frequency range between the upper and lower cutoff frequencies, the digital filters 46 and 48 also have additional zeroes at the frequency of the mechanical runout to provide further runout rejection (RR).

The plant model 44 and the digital filter 48 together form a combined digital filter 54 that provides a filtered plant model signal. It is further desirable that the digital filters 46 and 48 have additional zeroes placed at approximately zero Hz to stabilize the combined digital filter 54. These zeroes in the digital filter 48 may be used to cancel the poles of the unstable plant model 44 that are present at zero Hz due to its double integration operation. This results in a stable and quite simple combined prefilter.

Figure 4:
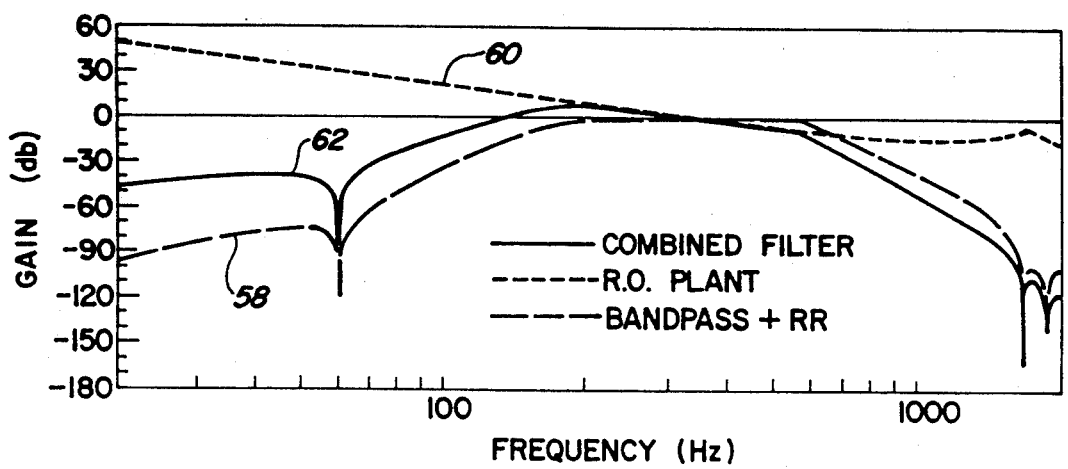
FIG. 4 is a graphical representation of frequency response characteristics for filters suitable for use in the present invention.

Suitable frequency response characteristics for the filters described above are shown in FIG. 4. A line 58 represents a typical frequency response characteristic that is suitable for the digital band-pass filters 46 and 48. A line 60 represents a typical frequency response characteristic that represents the double integration of the plant model 44. A line 62 represents the frequency response characteristic of the combined digital filter 54 when the plant model 44 has the frequency response characteristic represented by the line 60 and the digital bandpass filter 48 has the frequency response characteristic represented by the line 58.

The RLS identification 42 receives the filtered position error signal from the digital filter 46 on a line 52. The RLS identification 42 receives the filtered model signal from the combined digital filter via a line 56.

The RLS identification 42 uses the filtered position error signal on the line 52 and the filtered plant model signal on the line 56 to determine a most recent estimate of the reciprocal of the overall gain of the electro-mechanical plant of the servo system 34. The RLS identification 42 provides this estimate as the gain control signal on the line 40 to control the gain of the gain regulator 36 in proportion to the estimated reciprocal of the overall gain for the electro-mechanical plant.

Alternatively, the RLS identification 42 may be modified to determine the overall gain of the electro-mechanical plant. The RLS identification 42 supplies this estimate as the gain control signal on the line 40 to control the gain of the gain regulator 36. In this case, the gain of the gain regulator 36 is inversely proportional to the gain control signal on the line 40. However, it is more desirable to compute and utilize the estimated reciprocal of the gain to eliminate a time-consuming division operation in the gain adjustment regulator 36, as described in further detail herein.

The gain control signal on the line 40 is used to modify the overall gain so that the gain of the servo system 34 remains substantially constant, regardless of changes of gain in the electro-mechanical plant itself under operating conditions.

The RLS identification 42 is periodically initialized with a covariance reset signal on a line 58. This signal forces the RLS identification 42 to respond as if the gain control signal on the line 40 must be modified because of an inaccurate gain estimate, as described in detail below.

Figure 5:
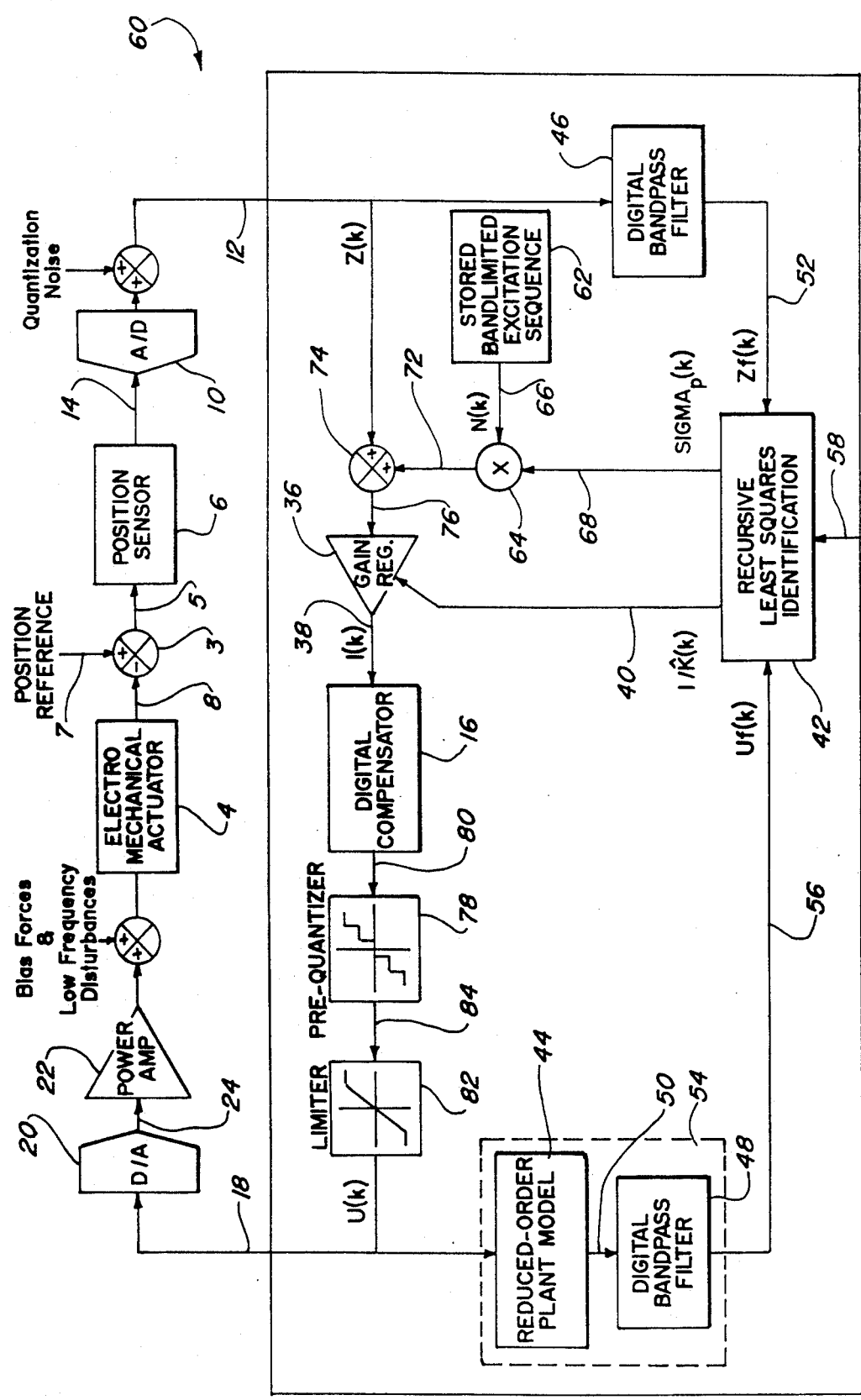
FIG. 5 is a block diagram of a servo control system according to the present invention that illustrates the insertion of an excitation signal in the feedback loop and disturbances to the servo loop.

Although a variety of different processes may be used by the RLS identification 42 to derive a gain control signal suitable for control of the gain controller 36 as described above, the methodology for a preferred implementation is shown in FIG. 5. The position sensor 6 senses the position of the electro-mechanical actuator 4 via the coupling 8 and it produces a position signal that is proportional to the sensed position. The comparator 3 produces a position error signal on the line 5 that is proportional to the difference between the position signal on the line 8 and the position reference signal on the line 7.

The A/D converter 10 periodically samples the level of the analog position error signal produced by the position sensor 6 on the line 14. The discretized position error signal samples produced by the A/D converter 10 are thereafter modified by the gain regulator 36 in accordance with the gain control signal from the identification process 42 on the line 40.

The digital compensator 16 processes the gain-modified position error signal sampled from the gain regulator 36 on the line 38. The discretized position signal samples produced by the A/D converter 10 and the plant model signal produced by the plant model 44 from the discretized command signal are both processed to estimate the effective gain of the servo system 34.

As indicated above, these signals are preferably band limited to reduce the possibility of an inaccurate estimation of plant gain due to extraneous noise and signal disturbances outside of the range of unity crossover frequencies at which the system is expected to vary. Furthermore, some of these signal components are also preferably notch filtered at selected frequencies to improve the estimation of overall plant gain by the identification process 42.

The digital filter 46 band-passes and optionally notch filters the discretized position error signal passed to the RLS identification 42 on a line 52. The digital filter network 54 doubly integrates, band-passes and optionally notch filters the discretized command signal passed to the RLS identification 42 on the line 56. The digital filter 48 should have the same characteristics as the filter 46.

The RLS identification 42 processes the filtered discretized position error signal received on the line 52 with the plant model signal received on the line 56 to estimate the reciprocal of the overall electro-mechanical plant gain over the range of gain of the electro-mechanical plant. The gain control signal produced by the RLS identification 42 on the line 40 is representative of the estimate of the reciprocal of the gain of the servo system 34 in the preferred embodiment.

The gain regulator 36 modifies the level of the modified discretized position signal on the line 38 to keep the overall gain of the servo system 34 relatively constant. The D/A converter 26 converts the gain regulated discretized command signal on the line 18 to the analog command signal on the line 4.

The power amplifier 22 amplifies the analog command signal on the line 24 to produce the correction signal on the line 26. The electro-mechanical actuator 4 responds to the correction signal on the line 24 to complete the loop.

In order to properly ascertain the gain of the electro-mechanical plant, it is desirable to inject an external excitation into the system 34. For this purpose, an excitation signal is injected into the feedback loop when identification occurs. The excitation signal is preferably derived from a noise source and band-limited to have signal components substantially within the frequency range of the filters 46 and 48. The excitation signal is ideally a product of zero-mean random white noise, filtered with a band-pass filter that is similar or identical to the filters 46 and 48, or a simulation thereof. It is also desirable for the intensity of this excitation signal to be attenuated as the RLS identification 42 provides more accurate estimations of reciprocal plant gain with successive samples.

It is also desirable to pre-quantize and range limit the discretized command signal produced by the digital compensator 16 to provide compatibility of this signal with the resolution and dynamic range of the D/A converter 20. This provides the identification with the best estimate of the control signal as seen by the physical plant. A servo system 60 that incorporates all of these additional features is represented by the block diagram in FIG. 5. The system 60 is otherwise substantially the same as the system 34 described above.

The generation of a zero-mean random noise signal is provided by an excitation signal source 62. The noise signal is preferably bandlimited and filtered to simulate filtration of the noise signal by a digital filter having the same or similar characteristics as the digital filters 46 and 48. The noise signal is preferably so limited in frequency range to avoid unnecessary excitation of the system 60 outside of the frequency range of the unity gain crossover frequency. Alternatively, the excitation signal source 62 may be a random white noise signal generator that is filtered by a digital filter that has the same or similar characteristics as the digital filters 46 and 48, or a random noise generator that otherwise has a frequency spectrum that simulates the cascading of a white noise source with a digital filter having the characteristics of the digital filters 46 and 48.

It is desirable to modulate the amplitude of the noise signal from the noise source 62 as the RLS identification 42 proceeds. The purpose of modulating excitation to the plant in this way is twofold. First, it provides sufficient excitation to ensure accurate and fast identification, especially when the servo is in a quiescent state. In addition, it minimizes the amplitude and the amount of time that the excitation is applied in accordance with the requirements of the identification process. An excitation modulation signal which is a filtered peak detected version of the rate of identification, generated by the RLS identification 42, is useful for this purpose, as described in detail below.

A mixer 64 multiplies the noise signal received from the noise source 62 on a line 66 with the excitation modulation signal from the RLS identification 42 on a line 68. The mixer 64 produces a modulated excitation signal comprising the product of the noise signal and the excitation modulation signal on an output line 72.

A summer 74 adds the modulated noise signal with the discretized position signal on the line 12 to produce a combined position signal on a line 76. The combined position signal is fed to the input of the gain regulator 36 on the line 76. In this case, the servo system 60 responds to the combination of the discretized position signal on the line 12 and the modulated noise signal on the line 72.

Because the modulated excitation signal on the line 72 comprises the noise signal on the line 66 modulated with the excitation modulation signal on the line 68, the modulated noise signal is ideal for its intended purpose as an excitation signal and its intensity diminishes as the RLS identification 42 improves its estimation of the reciprocal of overall plant gain.

The servo system 60 also includes a digital pre-quantizer 78 that is coupled to the output of the digital compensator 16 via a line 80. The pre-quantizer 80 is desirable to round-off the values of the output of the digital compensator 16 on the line 80 to match the resolution of the D/A converter 20.

The servo system further includes a digital limiter 82 to limit the range of the output of the digital compensator 16 to that of the D/A converter 20. The input of the digital limiter 82 is preferably coupled to the output of the pre-quantizer 78 via a line 84 so that the output of the digital compensator 16 is limited after pre-quantization by the pre-quantizer 78. The output of the limiter 82 is coupled to the line 18. In all other respects, the servo system 60 is substantially the same as the servo system 34 described above.

The identification process 42 preferably performs a Recursive Least Squares (RLS) identification of a single variable, the reciprocal of system gain in the servo system 60. The RLS identification process provides accurate identification with far fewer samples than with other techniques, such as with a fast Fourier transform (FFT).

Single parameter RLS identification is possible using discrete-time scalar variables. These variables are expressed as a function of a time index k, representing the sample of system variables for each time index k. Referring to FIG. 5, the first of these basic variables is the filtered plant output signal $Z_f(k)$ received by the identification process 42 on the line 52. The second variable is the filtered plant model signal $U_f(k)$ received by the identification process on the line 56.

The third (internal) variable is the Kalman gain L(k) that is a function of the filtered signals $U_f(k)$ and $Z_f(k)$, a fourth (internal) variable that comprises a covariance value P(k-1) for the preceding time index k-1, and a forgetting factor LAMBDA that may be assumed to have a constant value of one in this case. The Kalman gain may be represented by the relations $$L(k) = [P(k-1)*Z_f(k)]/[LAMBDA + Z_f^2(k)*P(k-1)]$$

The fourth variable, covariance P(k-1), may be represented by the relationship

P(k) = Abs. Val. $\{[1/LAMBDA]*[1-L(k)*Z_f(k)]*P(k-1)\}$.

A prediction error estimate, e(k), a fifth (internal) variable, may be represented by the relationship $$e(k) = U_f(k) - Z_f(k)*[1/\hat{K}(k-1)]$$

From these results, the reciprical plant gain 1/K(k) may be estimated. The estimated gain $1/\hat{K}(k)$ depends on the previous gain estimate $1/\hat{K}(k-1)$ as well as the Kalman gain and a prediction error estimate e(k) according to the relationship $$[1/\hat{K}(k)] = [1/\hat{K}(k-1)] + L(k)*e(k).$$

A gain identification (internal) variable SIGMA(k-1) may be represented by the relationship $$SIGMA(k-1) = Z_f(k)*L(k).$$

The value of SIGMA(k) varies between zero and one. The variables L(k), P(k), e(k) and SIGMA(k) are all provided by the RLS identification 42 based upon the inputs $Z_f(k)$ and $U_f(k)$, as well as initial values of P(k).

Figure 6A:
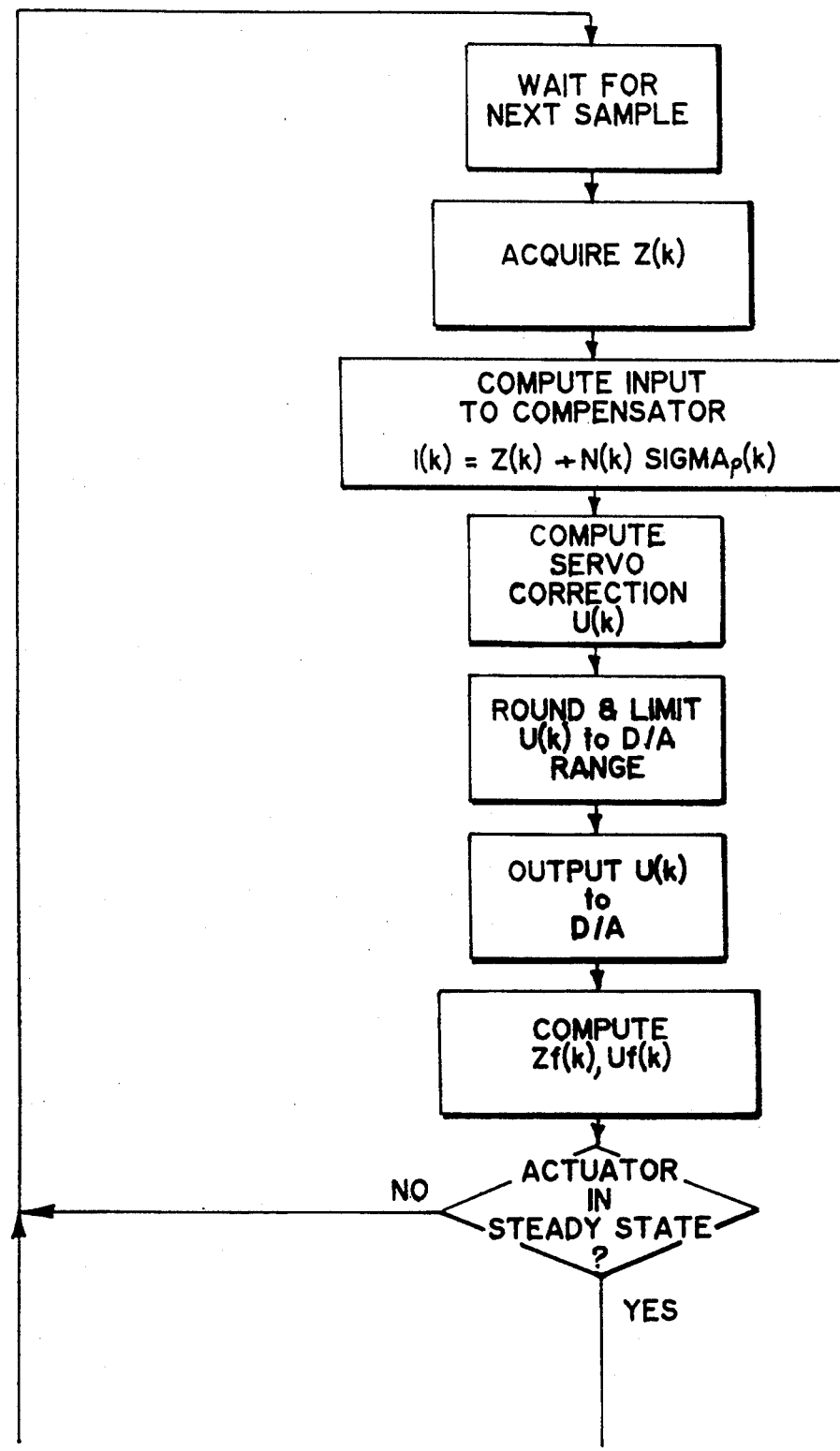
FIGS. 6A and 6B are flow charts that represent the methodology of the preferred embodiment of the present invention.
Figure 6B:
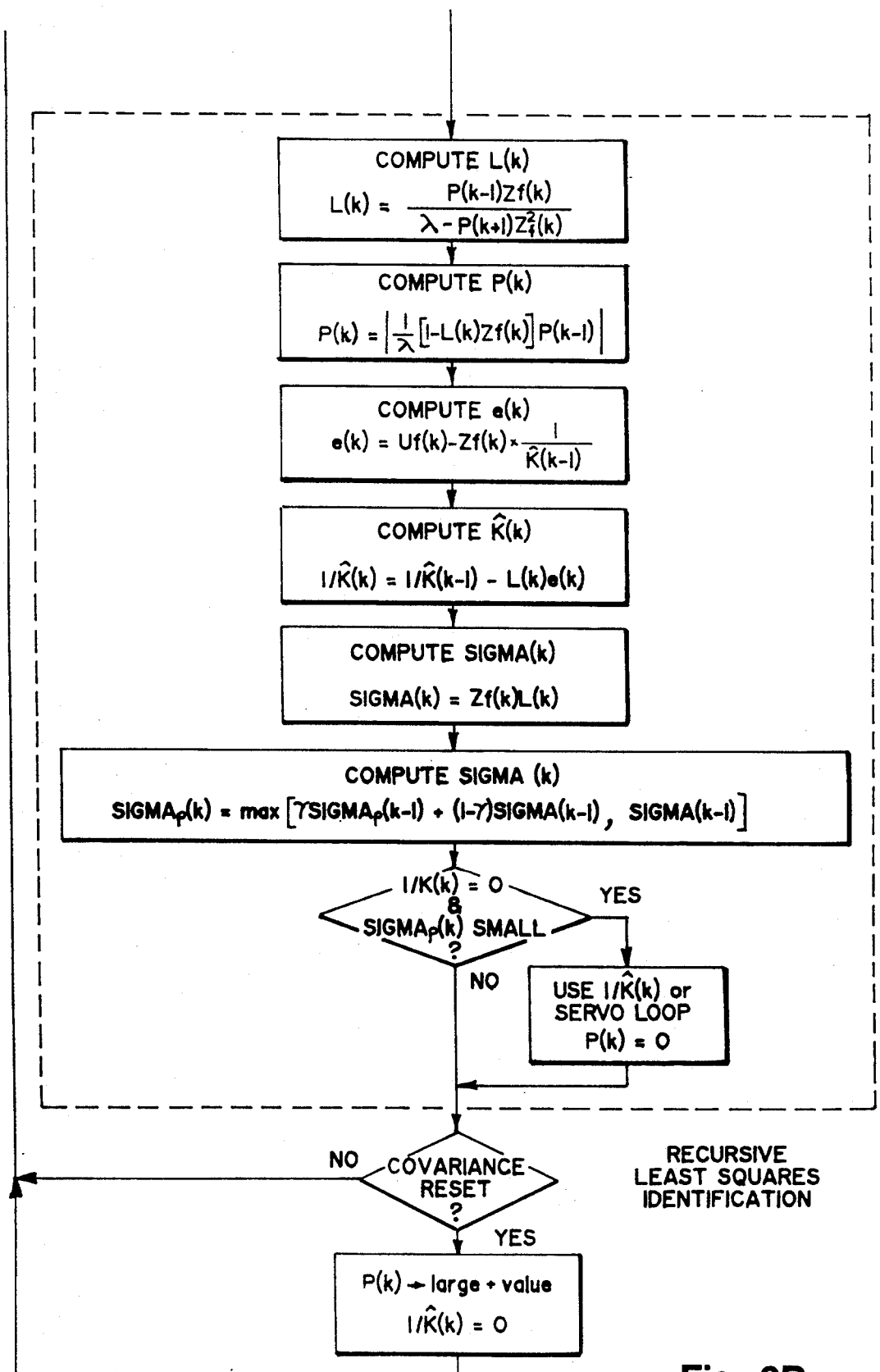

Because SIGMA(k) represents the rate of identification of the RLS process 42 to the plant gain, the excitation modulation signal from the identification process 42 is preferably derived from SIGMA(k). However, the value of SIGMA(k) varies radically and it is desirable to make the excitation modulation signal the average of the peak value of SIGMA(k), represented by the relationship $SIGMA_p(k) = max$
$\{[GAMMA*SIGMA_p(k-1)] + [(1-GAMMA)*$
$SIGMA(k-1), SIGMA(k-1)\}$ FIG. 6 is a flow chart that represents the methodology of the preferred embodiment of the present invention as described above in connection with FIG. 5. Referring to FIGS. 5 and 6 together, at the start of an initial cycle of the servo control process according to the present invention, the covariance signal P(k) is reset by the covariance reset signal on the line 58 to a large positive value at a time index k. The reset signal also causes the RLS identification 42 to initiate the value of estimated reciprocal gain to zero.

The A/D converter 10 samples the analog position signal supplied by the position sensor 6 on the line 14 at the discrete time index k to produce the discretized error signal for the time index k on the line 12. The analog position error signal supplied on the line 14 is preferably representative of the position error of the electro-mechanical actuator 4 from a desired position. Thus, the discretized position signal on the line 12 represents the position error of the electro-mechanical actuator at a discrete time index k.

The noise signal on the line 66 for time index k, represented by N(k), is multiplied with the excitation modulation signal $SIGMA_p(k)$ on the line 68 by the mixer 64 to provide the modulated noise signal $[N(k)*SIGMA_p(k)]$ on the line 72. Since there is no prior estimation of gain by the identification process 42 at this point, the value of $SIGMA_p(k)$ is simply one.

The summer 74 combines the discretized position signal Z(k) with the modulated noise signal $[N(k) * SIGMAP(k)]$ to produce a modified discretized position error signal on the line 76. The gain adjustment regulator 36 multiplies this result by the reciprocal plant gain estimate to produce a signal I(k) on the line 38. The digital compensator 16, upon receipt of the signal I(k), produces the discretized command signal U(k) on the line 80. The command signal U(k) is quantized and limited by the prequantizer 78 and the limiter 82 to pre-quantize and limit the value of U(k) on the line 18 to conform to the characteristics of the D/A converter 20.

At the same time, the discretized position signal Z(k) and the discretized command signal U(k) are filtered by the filters 46 and 54, respectively, to produce the filtered signals $Z_f(k)$ and $U_f(k)$, respectively. If the electro-mechanical actuator 4 is not in the steady state at this point, the procedure described above is repeated for the next sample of the A/D converter 10 at a discrete time index k+1.

If the electro-mechanical actuator 4 is in the steady state, the RLS identification 42 commences a gain estimation procedure. In accordance with FIG. 5, the following description concerns the determination of the reciprocal of the gain estimate, 1/K(k). The RLS identification 42 first determines the Kalman gain L(k). The Kalman gain L(k) is determined as the product of the previous value of co-variance P(k−1) and the filtered plant output signal $Z_f(k)$ divided by the sum of LAMBDA and the product of the previous value of covariance P(k−1) and the square of the filtered discretized command signal $Z_f(k)$.

The RLS identification 42 then determines a new value of the covariance P(k). The new value of P(k) is taken as the absolute value of a quantity comprising the previous value of covariance P(k−1) divided by LAMBDA and multiplied by the product of one minus the product of the Kalman gain L(k) and the filtered plant output signal $Z_f(k)$.

The RLS identification 42 then determines a new value for the prediction error estimate e(k). The new value of e(k) comprises the filtered plant model signal $U_f(k)$ minus the product of the filtered plant output signal $Z_f(k)$ and the previous reciprocal gain estimate $1/\hat{K}(k-1)$.

The RLS identification 42 then determines a new value for the estimated reciprocal gain $1/\hat{K}(k)$. The new value of $1/\hat{K}(k)$ comprises the previous value of estimated reciprocal gain $1/\hat{K}(k-1)$ plus the product of the Kalman gain L(k) and the prediction error e(k).

The RLS identification 42 then determines a new value for SIGMA(k). The new value of SIGMA(k) comprises the product of the filtered plant output signal $Z_f(k)$ and the Kalman gain L(k).

The RLS identification 42 then determines a new value of $SIGMA_p(k)$ Because the value of $SIGMA_p(k)$ comprises the measurement of the envelope of SIGMA(k), the value of $SIGMA_p(k)$ is affected by the rate of decay in the envelope, represented by the parameter GAMMA. The value of GAMMA typically ranges from about 0.95 to 0.995 for a time constant ranging from 20 to 200 samples, respectively, the time constant representing the reciprocal of the quantity one minus the value of GAMMA. The new value of $SIGMA_p(k)$ is the larger of two quantities: the first quantity comprises the sum of the product of the previous value of peak detected $SIGMA_p(k-1)$ and GAMMA and the quantity comprising one minus GAMMA and the previous value of identification outcome SIGMA (k−1). The second quantity is the previous value of identification outcome SIGMA (k-1).

If the estimate of reciprocal gain $1/\hat{K}(k)$ is not equal to zero, and the envelope of the identification outcome $SIGMA_p(k)$ is small, then the RLS identification 42 uses the estimate of reciprocal gain $1/\hat{K}(k)$ as the gain control signal $1/\hat{K}(k)$ on the line 40, and it sets the new value of co-variance P(k) equal to zero, in effect turning off the identification.

Otherwise, the process described above repeats with the next sample of the analog position signal by the A/D converter 10, unless a co-variance reset is initiated, in which case the covariance P(k) is set to a large value, the estimated reciprocal gain $1/\hat{K}(k)$ becomes zero, and then the process is then repeated as described above.

When the RLS identification 42 uses fixed-point digital processing, dynamic scaling techniques must be used to facilitate the large dynamic range for the estimation covariance, P(k). Scaling operations are added for all the dynamic variables, as shown in the flow chart of FIG. 7. The scaling operations are performed according to the arithmetic resolution required by the identification process 42.

Figure 8:
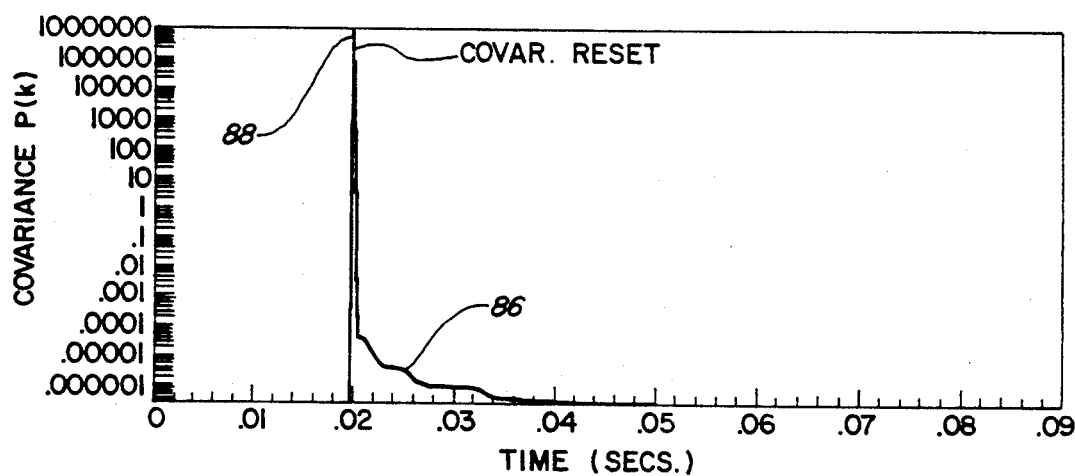
FIG. 8 is a graphical representation of covariance as a function of time index.
Figure 9:
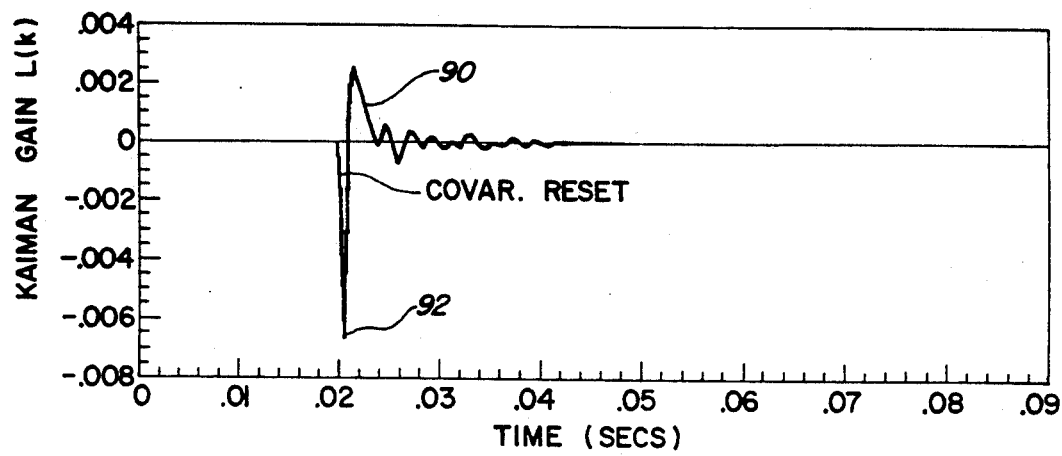
FIG. 9 is a graphical representation of Kalman gain as a function of time index.

Experimental results for the system according to the present invention as shown in FIG. 5 are shown in FIGS. 8 through 14. In FIG. 8, a line 86 represents the covariance P(k) as a function of time index k, and illustrates its large dynamic range and fast decay of covariance. A point 88 represents a covariance reset to initiate the gain identification process. In FIG. 9, a line 90 represents the Kalman gain L(k) as a function of time index k. A point 92 represents a covariance reset.

Figure 10:
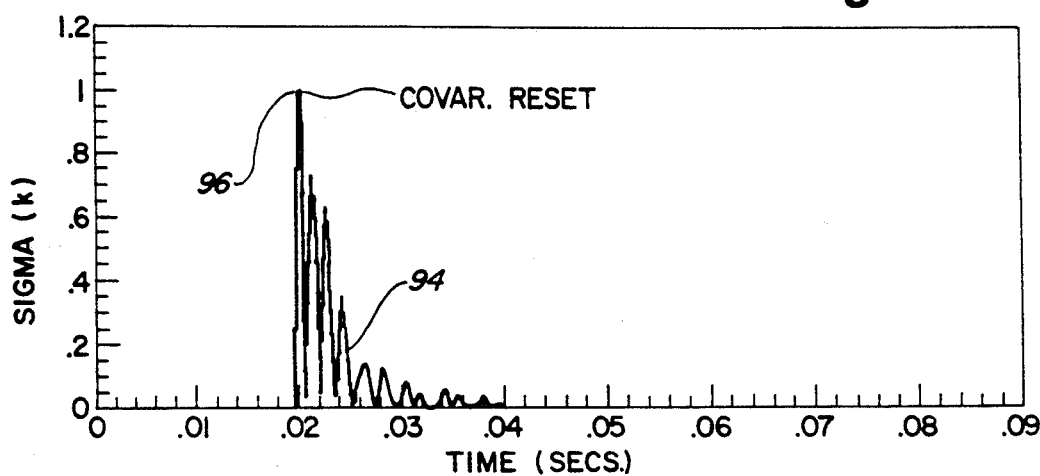
FIG. 10 is a graphical representation of SIGMA, the "rate of learning" or the "rate of identification" as a result of the identification process.
Figure 11:
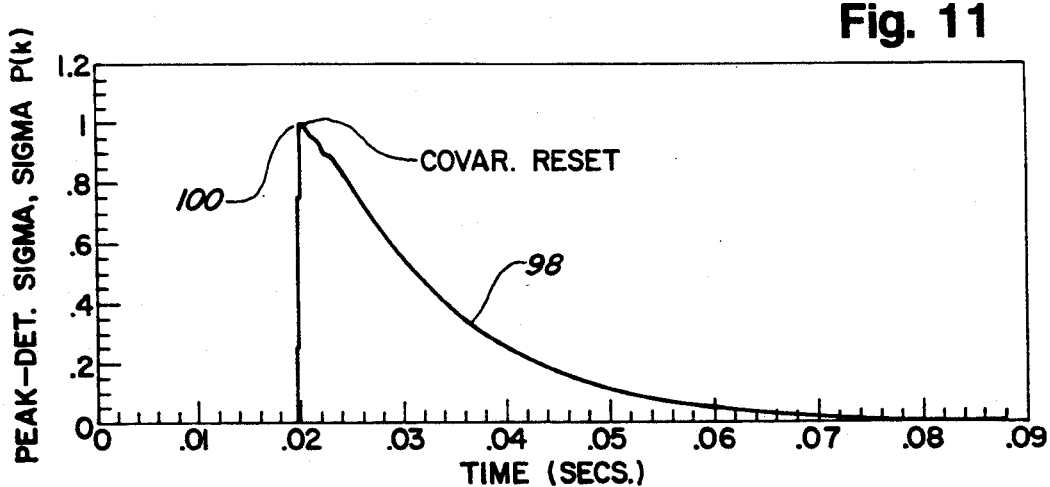
FIG. 11 is a graphical representation of the filtered and peak detected data in FIG. 10.

In FIG. 10, a line 94 represents the identification outcome SIGMA(k) as a function of time index k. A point 96 represents a covariance reset. A high rate of identification is shown upon covariance reset, represented by a point 96, because a large amount of input is received due to the excitation of the system. SIGMA(k) quickly decays as the RLS identification identifies the plant gain. In FIG. 11, a line 98 represents the envelope of the identification outcome $SIGMA_p(k)$ as a function of the time index k, illustrating how the excitation to the servo loop is modulated. A point 100 represents a co-variance reset.

Figure 12:
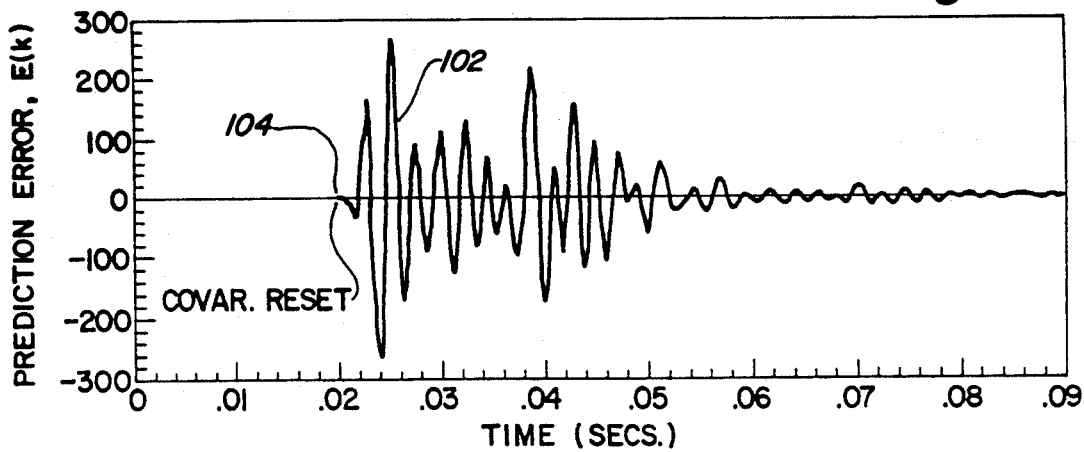
FIG. 12 is a graphical representation of prediction error as a function of time index.
Figure 13:
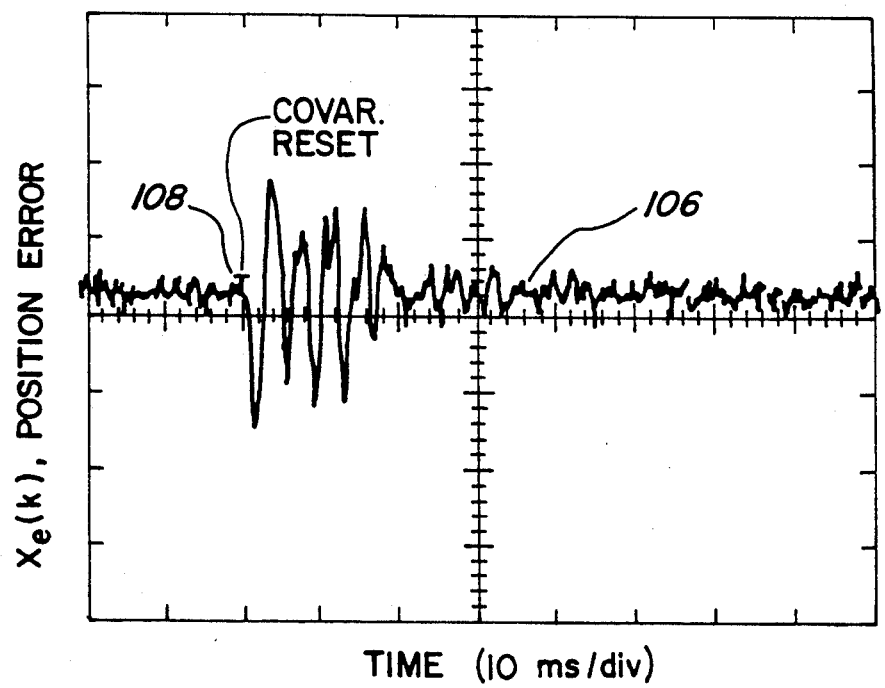
FIG. 13 is a graphical representation of position error as a function of time index.
Figure 14:
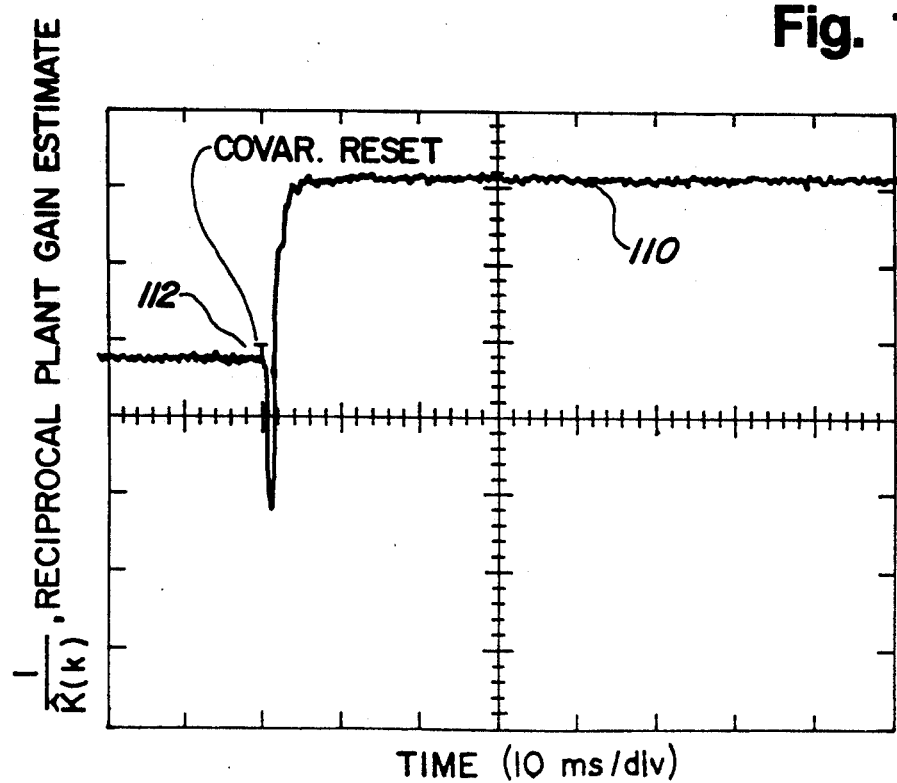
FIG. 14 is a graphical representation of the reciprocal of the gain estimate as a function of time index.

In FIG. 12, a line 102 represents the prediction error e(k) as a function of the time index k. A point 104 represents a co-variance reset. In FIG. 13, a line 106 represents position error of the electo-mechanical actuator 4 as a function of the time index k, symbolized by $X_e(k)$. A point 108 represents a covariance reset. In FIG. 14, a line 110 represents the reciprocal of the gain estimate, 1/K(k), as a function of the time index k. A point 112 represents a covariance reset. In the preferred embodiment, the reciprocal plant gain estimate converges in less than twenty samples for the system described herein and is accurate to within 0.2 db.

While the processes described herein determine the estimated reciprocal plant gain, it will be appreciated that the plant gain K(k) may alternatively be estimated. In this case, the gain adjustment regulator 36 divides rather than multiplies the signal on the line 76. The identification then determines the estimated plant gain $\hat{K}$ instead of the reciprocal estimated plant gain, $1/\hat{K}$ with appropriate modification, as for example, by interchanging the usage of $U_f(k)$ and $Z_f(k)$ in all RLS identification operations.

Thus, there has been described above methods and apparatus for automatically regulating loop gain or bandwidth in a servo system to adapt to changes in operating conditions and variations in physical parameters of the system by sensing the gain of the electro-mechanical plant in the system with injection of an excitation signal that is fed through the loop and then estimating and correcting the gain of the loop based upon the effect of the excitation signal on the system. Various changes in the details, methodology, parts and configurations described above to explain the nature of the present invention may be made by those skilled in the art within the principle and scope of the present invention as expressed in the appended claims.

What is claimed is:

1. A method for continuously adjusting servo loop gain in a digital position control system for controlling an electro-mechanical plant comprising:
   sensing the position of said electro-mechanical plant and providing a discretized plant output signal;
   adjusting said discretized plant output signal to provide a control signal;
   filtering said discretized plant output signal to provide a filtered plant output signal;
   determining a reduced-order plant model from said control signal to provide a plant model signal;
   filtering said plant model signal to provide a filtered plant mode signal;
   identifying a first value attributable to an estimated overall plant gain from selected parameters characteristic of the mechanical plant derived from said filtered plant output signal and said filtered plant model signal and providing an estimated gain output signal;
   adjusting said control signal in accordance with said estimated gain output signal for providing a regulated control signal; and
   applying said regulated control signal to said electro-mechanical plant.

2. The method of claim 1 wherein said first value attributable to said estimated overall plant gain is a reciprocal of said estimated overall plant gain.

3. The method of claim 1 wherein at least one of said selected parameters is a prior one of said overall plant gain estimate values.

4. The method of claim 2 wherein said step of identifying s id estimated overall plant gain further includes:
   supplying a covariance reset signal for initializing said first value attributable to said estimated overall plant gain;
   determining a second value indicative of covariance from said covariance reset signal;
   determining a third value indicative of Kalman gain from said second value indicative of covariance, said filtered plant output signal and said filtered plant model signal
   determining a fourth value indicative of a prediction error estimate from said filtered plant output signal, said filtered plant model signal, and said prior one of said overall plant gain estimates; and,
   determining said first value indicative of overall plant gain from said third value indicative of Kalman gain, said fourth value indicative of prediction error estimate, and a successive one of said overall plant gain estimates.

5. The method of claim 4 further including:
   determining a fifth value indicative of rate of identification from said filtered plant output signal and said third value indicative of Kalman gain and providing a modulation signal;
   supplying an excitation signal within a preselected bandwidth;
   combining said excitation signal with said modulation signal and providing a modulated excitation output signal; and,
   adding said modulated excitation output signal with said plant output signal for providing modified plant output signal.

6. The method of claim 1 wherein said plant model signal and said plant output signal are each bandpass filtered within a selected frequency range corresponding to an expected unity-gain crossover frequency of the mechanical plant for restricting the frequency content of said signals.

7. A method for continuously adjusting servo loop gain in a digital servo position control system incorporated in a data storage disc drive having an electromechanical actuator for positioning a controlled element, comprising the steps of:
   sensing the position of said controlled element and providing a discretized position output signal;
   adjusting said discretized position output signal to provide a control signal;
   filtering said discretized position output signal to provide a filtered position output signal;
   determining a reduced-order plant model from said control signal to provide a plant model signal;
   filtering said plant model signal to provide a filtered plant model signal;
   identifying a value attributable to an estimated overall plant gain from selected parameters characteristic of the mechanical plant derived from said filtered plant output signal and said filtered plant model signal and providing an estimated gain output signal;

adjusting said control signal in accordance with said estimated gain output signal for providing a regulated control signal; and applying said regulated control signal to said actuator 8. An adaptive control system for controlling servo loop gain in an electro-mechanical plant, including digital compensator means for providing a control signal to said electro-mechanical plant, said digital compensator means responsive to a discretized plant output signal indicative of the position of said plant, comprising:

sensing means for sensing the position of said mechanical plant and providing a plant output signal;

processing means including gain adjustment means for adjusting said plant output signal to provide a control signal, first digital filtering means for filtering said plant output signal to provide a filtered plant output signal, means for utilizing a reduced-order plant model to filter said control signal to provide a plant model signal, second digital filtering means for filtering said plant model signal to provide a filtered plant model signal, means for providing selected parameters characteristic of the mechanical plant from said filtered plant output signal and said filtered plant model signal, means for determining an estimated overall plant gain from selected ones of said parameters and for providing an estimated gain output signal, and means for adjusting said control signal in accordance with said estimated gain output signal; and, means for applying said control signal to said mechanical plant.

9. The control system of claim 8 wherein said processing means further comprises:

means for providing an excitation signal sequence within a preselected bandwidth;

means for providing a modulation signal indicative of a rate of identification, said excitation signal sequence and said modulation signal being combined to provide a modulated excitation output signal; and, first summing means for adding said modulated excitation output signal with said plant output signal and for providing said signal to said gain adjustment means.

10. The control system of claim 8 wherein said first filtering means band pass filters said plant output signal and said second filtering means band pass filters said plant model signal within a selected frequency range corresponding to the range of possible unity-gain crossover frequencies of the mechanical plant.

* * * * *